No. 734,420. PATENTED JULY 21, 1903.
M. N. KIRKHUFF.
LOCK LEVER.
APPLICATION FILED APR. 8, 1903.
NO MODEL.
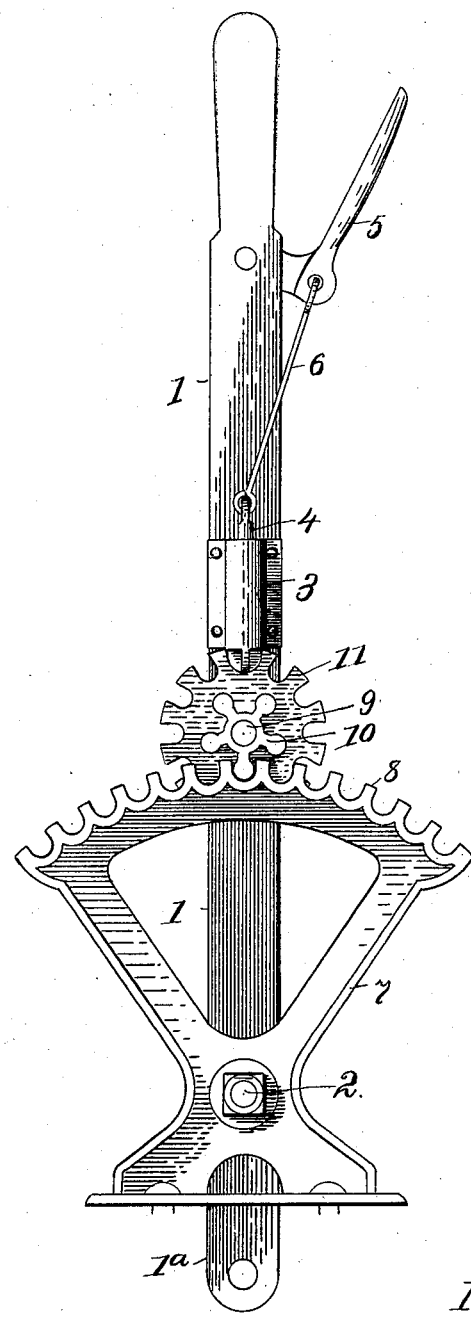
Witnesses
Fay Graham
Ina C. Graham.
Inventor,
Marshall N. Kirkhuff.
by L. P. Graham
his attorney.

No. 734,420. Patented July 21, 1903.

UNITED STATES PATENT OFFICE.

MARSHALL N. KIRKHUFF, OF CANTON, ILLINOIS, ASSIGNOR TO PARLIN & ORENDORFF COMPANY, OF CANTON, ILLINOIS, A CORPORATION OF ILLINOIS.

LOCK-LEVER.

SPECIFICATION forming part of Letters Patent No. 734,420, dated July 21, 1903.

Application filed April 8, 1903. Serial No. 151,672. (No model.)

*To all whom it may concern:*

Be it known that I, MARSHALL N. KIRKHUFF, of the city of Canton, county of Fulton, and State of Illinois, have invented a certain new and useful Lock-Lever, of which the following is a specification.

This invention is particularly applicable to agricultural implements, although its use is not confined to that particular branch of mechanics; and the object is to provide means for securely holding a lever at various minute differences of position.

It is common practice to provide lock-levers with notched arcs concentric with the fulcrums of the levers and to place slidable bolts on the levers in position to engage the notches and hold the levers in different positions, but where the lever is used for heavy work the bolt must be large to be strong, the spaces between notches must be rather wide for the same reason, and delicate adjustment is out of the question. Ordinarily the teeth of the arc and the bolt of the lever may be made strong enough while permitting the delicacy of adjustment required, but there are cases where this is impossible, and to such cases the present invention is applicable.

In the drawing forming part of this specification a lever constructed in accordance with my invention is shown in elevation.

The power end of the lever is shown at 1, and the weight or work end thereof at 1ª. The lever is fulcrumed at 2 in a suitable bearing, which in this instance comprises a frame 7, and the arc-formed rack 8 is formed on frame 7 concentric with the fulcrum. A toothed wheel 10 is journaled on a pin or stud 9, which projects laterally from a face of the lever 1, and the teeth of wheel 10 are shaped to engage the notches of the rack 8. A larger wheel 11 is formed integral with or is rigidly secured to the toothed wheel 10, and the wheel 11 is provided with notches in its perimeter to receive the lock-bolt of the lever.

The construction of the lock-bolt of the lever is immaterial so far as this invention is concerned, but in this instance it is shown in the usual form. A housing 3 is secured to the lever. The bolt 4 has sliding bearings in the housing and is pressed into engagement with the notched wheel 11 by a spring. (Not shown.) A hand-lever 5 is pivotally connected with the power end of the lock-lever, and a link 6 connects the hand-lever with bolt 4. In this instance there are five teeth on wheel 10 and twelve notches in the larger wheel 11. Consequently the lever is adjusted five-twelfths of one of the notches of rack 8 whenever the wheel 11 is shifted a notch with reference to the lock-bolt 4. This proportion between the toothed wheel and the notched wheel may be varied to give still nicer adjustment of the lever, if desired, and it will be readily seen that the strength of the locking adjuncts of the lever is not impaired by providing for delicacy of adjustment.

The extension 1ª is representative merely of the power end of the lever, and it is obvious that motion may be imparted from the lever to the work required of the lever in various ways. The lever may be of any desired construction and of either of the three classes, and the bolt may be actuated and controlled in any well-known manner.

I claim—

1. In a lock-lever, the combination of a lever, a fulcrum for the lever, an arc-formed rack concentric with the fulcrum of the lever, a toothed wheel journaled on the lever in mesh with the rack, a larger notched wheel concentric with the toothed wheel and rigid therewith, and a bolt on the lever to engage the notches of the notched wheel.

2. In a lock-lever, the combination of a lever, a fulcrum for the lever, an arc-formed rack concentric with the fulcrum of the lever, a toothed wheel journaled on the lever in mesh with the rack, a larger notched wheel integral and concentric with the toothed wheel, a bolt on the lever to engage the notched wheel and a hand-lever on the main lever connected with the bolt.

In testimony whereof I sign my name in the presence of two subscribing witnesses.

MARSHALL N. KIRKHUFF.

Witnesses:
C. F. PROETSLING,
ALICE C. MILLER.